United States Patent [19]
Rowan

[11] Patent Number: 5,986,426
[45] Date of Patent: Nov. 16, 1999

[54] ADAPTIVE PULSE WIDTH MODULATED MOTOR CONTROL

[75] Inventor: Bryan Scott Rowan, San Jose, Calif.

[73] Assignee: International Business Machines Corporation, Armonk, N.Y.

[21] Appl. No.: 08/906,306

[22] Filed: Aug. 5, 1997

[51] Int. Cl.⁶ .................................................. G05B 11/28
[52] U.S. Cl. .................. 318/599; 360/73.01; 360/73.03; 369/54; 318/432; 388/811; 388/819
[58] Field of Search ............................. 360/73.01, 73.02, 360/73.03; 369/59, 58, 55, 54; 318/603, 432, 610, 601, 600, 609, 599; 388/811, 819

[56] References Cited

U.S. PATENT DOCUMENTS

| | | | |
|---|---|---|---|
| Re. 34,399 | 10/1993 | Gami et al. | 360/73.01 |
| 4,249,116 | 2/1981 | Hieda | 318/254 |
| 4,359,674 | 11/1982 | Gotou | 318/318 |
| 4,371,818 | 2/1983 | Lewis | 318/313 |
| 4,383,209 | 5/1983 | Lewis | 318/696 |
| 4,393,339 | 7/1983 | Kimura | 318/254 |
| 4,491,771 | 1/1985 | Kimura | 318/254 |
| 4,647,828 | 3/1987 | Wachi | 318/603 |
| 4,749,927 | 6/1988 | Rodal et al. | 318/599 |
| 5,161,073 | 11/1992 | Gami et al. | 360/73.03 |
| 5,193,146 | 3/1993 | Kohno | 388/811 |
| 5,204,594 | 4/1993 | Carobolante | 318/254 |
| 5,210,474 | 5/1993 | Oswald | 318/254 |
| 5,241,251 | 8/1993 | Wakui | 318/599 |
| 5,246,479 | 9/1993 | Gami et al. | 360/73.03 |
| 5,289,097 | 2/1994 | Erickson et al. | 318/561 |
| 5,296,789 | 3/1994 | Ohi | 318/254 |
| 5,307,439 | 4/1994 | Enami | 388/811 |
| 5,444,582 | 8/1995 | Suzuki | 360/78.09 |
| 5,517,095 | 5/1996 | Carobolante et al. | 318/254 |
| 5,550,446 | 8/1996 | Schlager et al. | 318/439 |
| 5,631,887 | 5/1997 | Hurst, Jr. | 369/59 |
| 5,780,986 | 7/1998 | Shelton et al. | 318/432 |

FOREIGN PATENT DOCUMENTS

| | | | |
|---|---|---|---|
| 2-61857 | 3/1990 | Japan | G11B 19/20 |
| 4-109458 | 4/1992 | Japan | G11B 19/00 |
| 4-161081 | 6/1992 | Japan | H02P 5/00 |
| 5-109180 | 4/1993 | Japan | G11B 19/26 |
| 6-28790 | 2/1994 | Japan | G11B 21/08 |
| 6-217587 | 8/1994 | Japan | H02P 6/02 |

*Primary Examiner*—Karen Masih
*Attorney, Agent, or Firm*—Gray Cary Ware Freidenrich

[57] ABSTRACT

A motor control method and apparatus for spindle motor control and for voice coil motor (VCM) control in a direct access storage device (DASD). Characteristics of the pulse width modulation (PWM) waveform are adapted to allow tradeoffs to be made between lower noise emission, greater power efficiency, and current ripple in the motor in order to optimize the driver operation. The transition rate of the PWM waveform is modified by changing the "off-time", which is maintained as a constant in a control register, in response to a change in the condition or mode of operation of the DASD. The "slew rate" of the PWM waveform is also controlled by a changing the value of a constant stored within the control register and can be modified in response to changes in the condition or operational mode of the DASD. In addition, in accordance with the present invention, the current that flows through the spindle motor windings during commutations is controlled by pulsing the power amplifier drive circuit at a relatively high rate in order to maintain a relatively constant total current through the windings of the motor, thus reducing acoustic noise. Thus, mechanical vibrations which result in acoustic noise are prevented or suppressed.

26 Claims, 9 Drawing Sheets

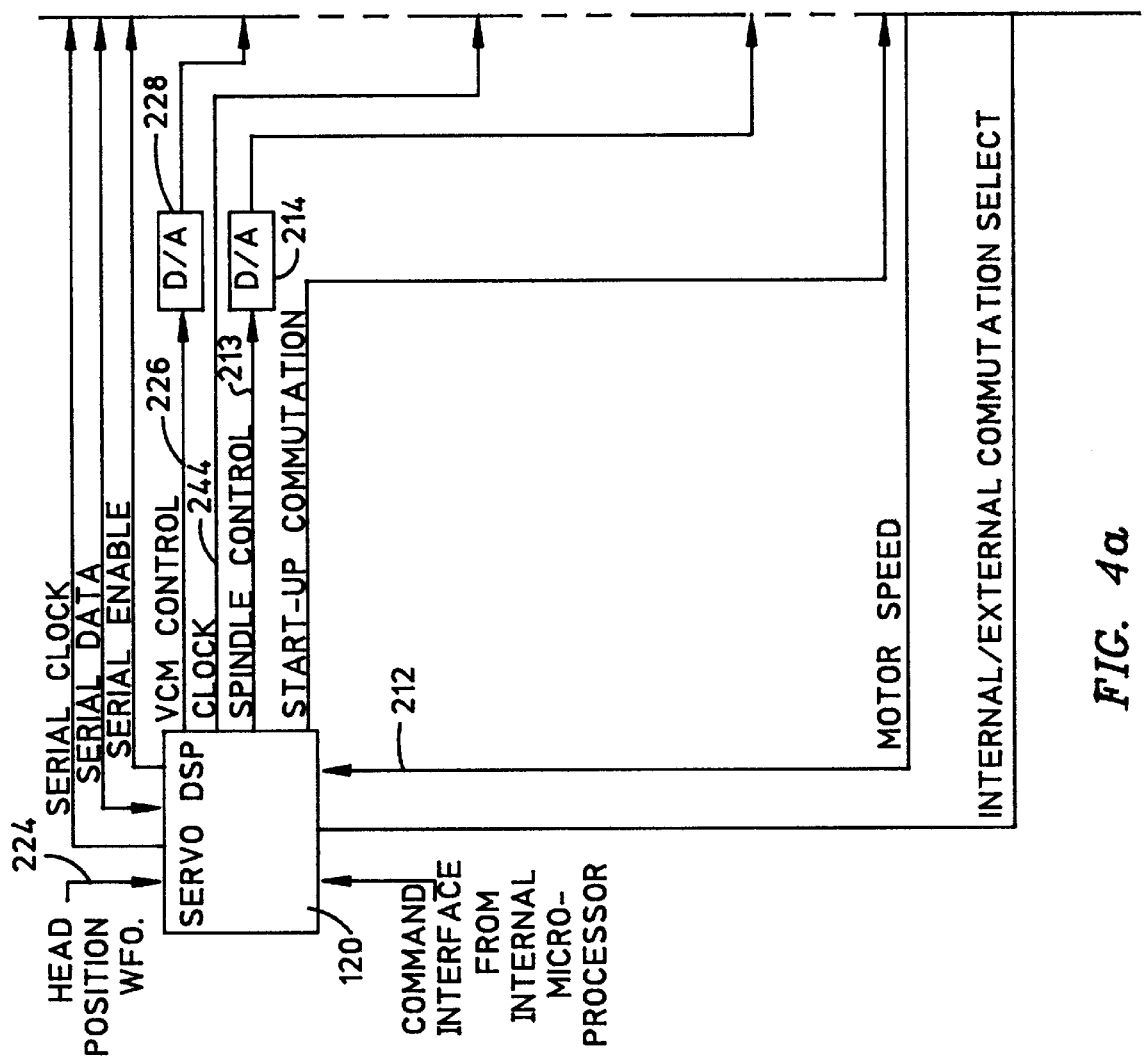

ADAPTIVE PULSE WIDTH MODULATED MOTOR CONTROL

BACKGROUND OF THE INVENTION

1. Field of the Invention

The present invention relates to a direct access storage device (DASD) of the type that includes a motor, and more particularly to a method and apparatus for controlling a motor within a DASD using pulse width modulated control signals.

2. Description of the Related Art

Direct access storage devices (DASDs) incorporating stacked, commonly rotated rigid magnetic disks are used for storage of data in magnetic form on the surfaces of the disks. Typically, the disks are mounted in parallel for simultaneous rotation and by an integrated spindle and motor assembly. Transducer heads are driven in a path toward and away from a drive axis in order to position the heads over the disks to allow data to be written to the disks and read from the disks. Data is recorded in data information tracks provided on the surfaces of the disks.

FIG. 1 is a block diagram of a prior art DASD 100 having a spindle motor and a voice coil motor 128. The spindle motor 102 causes a disk 104 to rotate about a spindle 106. A voice coil motor (VCM) 128 causes a read/write head 108 to be positioned over the disk 104. The disk 104 is treated with magnetic material which allows information to be encoded thereon by manipulation of a magnetic field generated by the read/write head 108. Information that is read and written to the head is coupled to and from the read/write head 108 through a read/write preamplifier 110.

Additional data (commonly referred to as "servo" information) is stored with the user data on the disk. Servo information provides feedback for the VCM regarding the current position of the read/write head 108 to allow the read/write head to be properly positioned over known locations on the disk at which data is to be stored, and from which data is to be read. A servo demodulator 112 distinguishes the servo information from user data. User data is coupled through a data channel 114 to an interface microprocessor 116 which controls the communication of the user data to and from a host computer (not shown) through an interface controller 118. The servo data is coupled to a servo digital signal processor (DSP) 120.

The servo DSP 120 processes the servo information in order to produce control signals which control the speed of the spindle motor 102 and the motion of the VCM. The control signals that are generated by the servo DSP 120 are coupled to a VCM/spindle pre-driver circuit 122. The VCM/spindle pre-drive circuit 122 generates drive signals to a VCM power amplifier 124 and to a spindle power amplifier 126. The VCM power amplifier 124 in turn drives the VCM 128 to position the read/write head appropriately. Likewise the spindle power amplifier 126 drives the spindle motor 102 to cause the spindle motor 102 to achieve and maintain a desired rotational velocity.

Typically, a brushless, direct current (DC) spindle motor is used in disk drives. Spindle motor control is accomplished in accordance with one of two methods; a linear drive method or a pulse width modulation (PWM) drive method. Similarly, the VCM can be driven by either a linear drive method or a PWM drive method. Linear drive requires that current be continuously applied to the windings of the motor. In contrast, a PWM drive method requires that current is provided in pulses to the windings. A hybrid method can be used for motor control by selecting PWM drive during one portion of the operation of the DASD, and linear drive during other modes of operation. The PWM drive method has been used to improve efficiency and thus limit the high-power dissipation, particularly in the spindle motor at startup. Because current is pulsed through the windings of the spindle motor, the overall power required to rotate the motor in accordance with PWM drive techniques is less than that required for driving the motor in accordance with the linear drive method. However, pulsing the current through the winding and drive circuit components generates electrical noise which can be coupled to other circuits in the DASD. In particular, the relatively fast rise and fall times that occur in the transitions between on and off times tend to generate harmonic overtones which result in high frequency electrical noise. Accordingly, the linear drive method is the more popular than PWM drive because less electrical noise is generated.

One commercially available drive device, part number L6232, is manufactured and sold by SGS-Thompson Microelectronics for use in brushless DC motor applications, and particularly for use with disk drive applications. This device includes circuitry to perform both PWM drive and linear drive. The spindle driver is described for use to limit the high-powered dissipation that occurs during spindle startup by employing PWM drive during start-up, and then switching to linear drive when the disk approaches normal operating spindle speed, thus reducing the noise generated by the PWM drive. However, by switching to linear drive as soon as the disk reaches (or approaches) operating speed, the benefits of PWM drive are realized only during start-up. More particularly, the improved power efficiency that could be achieved by use of PWM drive cannot be used during at least some operations (such as reading and writing) due to the electrical noise that is typically generated by the PWM drive method.

Therefore, while the prior art motor control systems provide generally effective operation, it is desirable to provide an improved method and apparatus for spindle mode control in order to provide reduced power consumption by use of PWM drive, while reducing the electrical noise generated by the PWM drive method in order to limit disruption of the operation of the DASD.

Furthermore, in a typical three phase motor, three motor windings are provided through which current flows in a sequence known as a "commutation" scheme. The commutation scheme determines when current is to flow through each of the windings. FIG. 2 is an plot of the current that flows through the three windings of a three phase motor in accordance with one commutation scheme. FIG. 3 is a schematic of the output stages of a power amplifier 126 which drives the windings 301, 303, 305 of a three phase motor. It can be seen from FIG. 2, that at any one time, one winding is conducting current in a positive direction, one winding is conducting current in a negative direction, and one winding is not conducting at all. For the purpose of this discussion, it can be assumed that the positive direction of current flow is from the power amplifier toward the motor and that the negative direction of current flow is from the motor toward the power amplifier. From FIG. 3 it can be seen that in order to have current flow through any one winding, current must also flow through at least one other winding. That is, current flows from the positive power supply through one of three upper output transistors 307, 311, 315, then through the each of the windings coupled to each upper transistor that is conducting, assuming that at least one of the lower transistors 309, 313, 317 are also conducting, and through the winding that is coupled to the conducting lower transistor.

From FIG. 2 it can be seen that there are six distinct commutation phases, noted as phase 1 through phase 6 in the figure. Note that phase 1 and phase 2 are repeated in the figure. In each such phase, current flows through only two windings. For example, in the first phase, winding "A" is conducting in the positive direction, winding "B" is not conducting, and winding "C" is conducting in the negative direction. Accordingly, in phase 1 of the commutation scheme, only output transistor 307 coupled to winding A and output transistor 317 coupled to winding C are conducting. Each of the other four output transistors 309, 311, 313, 315 are "turned off" (i.e., not conducting).

In the second phase, output transistor 317 turns off and output transistor 313 turns on. As can be seen from FIG. 2, there is a perturbation in the current that flows through winding A due to the ramping down of the current in winding C (i.e., output transistor 317 turning off) before the current through winding B can achieve sufficient level to maintain the current in winding A (i.e., before output transistor 313 can start conducting sufficiently). This perturbation in the current through the windings of the motor causes a mechanical vibration which occurs at the commutation frequency in the motor, associated enclosure, and structures to which the motor enclosure is mechanically coupled. In many cases, the commutation frequency is in the audio range. For example, in one such spindle motor drive circuit, the commutations occur at 2.88 kHz. Therefore, it would be desirable to eliminate the perturbation in the current in order to reduce the acoustic noise generated by operation of the spindle motor.

SUMMARY OF THE INVENTION

The present invention is a motor control method and apparatus for spindle motor control and for voice coil motor (VCM) control in a direct access storage device (DASD). In accordance with the preferred embodiment with the present invention, characteristics of the pulse width modulation (PWM) waveform are modified or "adapted" to allow tradeoffs to be made between lower noise emission, greater power efficiency, and current ripple in the motor in order to optimize the driver operation. For example, if reduction of electrical noise is a primary consideration, the PWM waveform can be adapted to have a relatively low transition rate (i.e., a reduced number of pulses within a predetermined time) at the expense of current ripple in the motor and slower pulse rise and fall times at the expense of power efficiency. On the other hand, if electrical noise reduction is less important than improved efficiency, as is typically the case during start-up, then the rise and fall times of the pulses can be increased to improve the efficiency of the drive circuit while maintaining the transition rate. Likewise, if reducing the current ripple is of concern, then the transition rate can be increased.

In accordance with one embodiment of the present invention, the transition rate of the PWM waveform is modified by changing the "off-time", which is maintained as a constant in a control register, in response to a change in the condition or mode of operation of the DASD. In addition, the "slew rate" of the PWM waveform (i.e., the rate at which the voltage rises and falls at the beginning and end, respectively, of each pulse) is also controlled by a changing the value of a constant stored within the control register and can be modified in response to changes in the condition or operational mode of the DASD. Reducing the slew rate increases the switching losses that occur during transitions. However, reducing the slew rate also lowers the frequency of the harmonic overtones of the PWM waveform. In an alternative embodiment, the total cycle time of the PWM waveform (as opposed to the off-time) is maintained as a constant and can be changed in response to changes in the condition or operational mode of the DASD.

In addition, in accordance with the present invention, the current that flows through the spindle motor windings during commutations is controlled by pulsing the power amplifier drive circuit at a relatively high rate in order to maintain a relatively constant total current through the windings of the motor, thus reducing acoustic noise. By pulsing the current in the windings during commutations, the total current that flows through the three windings of the motor is maintained essentially constant. Thus, mechanical vibrations which result in acoustic noise are prevented or suppressed.

By determining a set of optimum pulsed control signal characteristics to be used when particular operating conditions exist, a tradeoff between efficiency and noise generation can be established to optimize the performance of the DASD.

BRIEF DESCRIPTION OF THE DRAWING

FIGS. 4a and 4b are a block diagram of a VCM power amplifier, a spindle power amplifier, and a voice coil motor/spindle drive circuit in accordance with the present invention.

DETAILED DESCRIPTION OF THE PREFERRED EMBODIMENTS

Figure 4B:
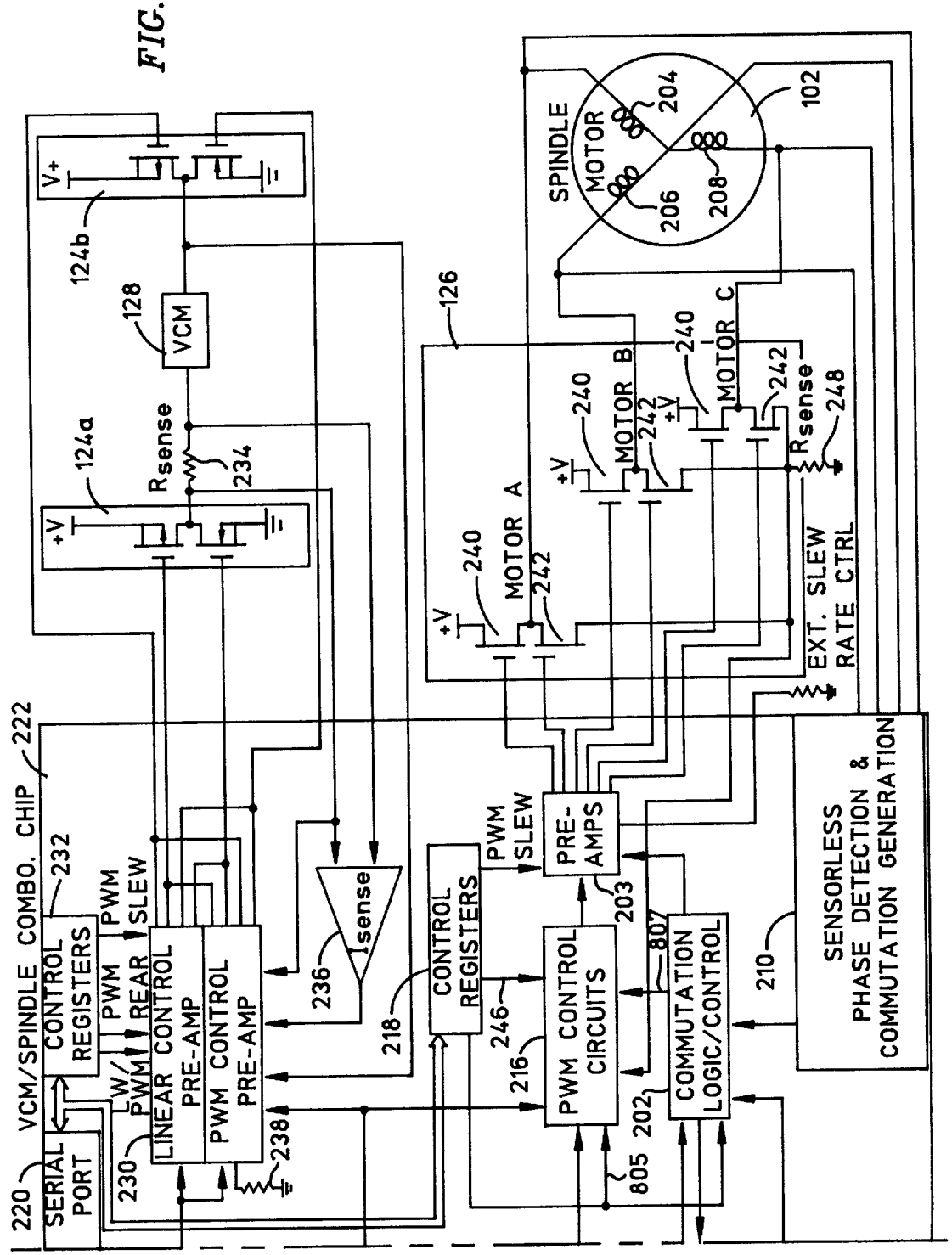

FIG. 4 is a block diagram of a spindle motor 102, voice coil motor (VCM) 128, a VCM power amplifier 124a, 124b, a spindle power amplifier 126, a VCM/spindle drive circuit 222, and a servo digital signal processor (DSP) 120 in accordance with the present invention. In addition, FIG. 4 shows selected signals associated with the servo DSP 120 and the inventive VCM/spindle drive circuit 222.

The circuitry of the VCM/spindle drive circuit 222 essentially consists of two circuits, a VCM drive circuit for generating VCM drive signals and a spindle motor drive circuit for generating spindle motor drive signals. The spindle motor drive circuit includes a commutation logic/control circuit 202, a spindle motor pre-amplifier 203, a circuit for detecting the spindle motor speed and rotational position 210, a pulse width modulator (PWM) control circuit 216, and a control register 218. The VCM drive circuit includes a linear/PWM control pre-amplifier 230, a control register 232, and a current sensor 236.

Spindle Motor Drive Circuit

The control register 218 allows the servo DSP 120 to control the number of transitions in the signal output from the PWM control circuit 216 that occur within a predetermined amount of time (i.e., the "transition rate"). Accordingly, the servo DSP 120 can reduce transition rate at noise or power sensitive times in the operation of the DASD, and increase the transition rate at times when current control is more important than efficiency. The control register 218 also allows the servo DSP 120 to control the slew rate of the pre-amplifier 203 in order to reduce the high frequency harmonic content of the signal output from the pre-amplifier 203 during noise sensitive times in the operation of the DASD, and increase the slew rate during times when efficiency is more important than noise reduction. Still further, the control register 218 allows the servo DSP 120 to activate an acoustic noise reduction scheme, as is described in greater detail below.

Upon initial application of power to a DASD comprising the present invention, the servo DSP 120 generates start-up commutation signals which are coupled to the commutation logic/control circuit 202. The commutation logic/control circuit 202 generates spindle motor commutation signals which are coupled to the spindle motor pre-amplifier 203 to cause drive signals output from the pre-amplifier 203 to be applied to the spindle motor windings 204, 206, 208 at the appropriate time and with the appropriate polarity. In accordance with one embodiment of the present invention, the windings 204, 206, 208 are also coupled to the sensorless phase detection and commutation generation circuit 210, which provides feedback to the commutation logic/control circuit 202 which determines the speed and rotational position of the spindle motor 102. The commutation logic/control circuit 202 couples a "motor speed" signal over a signal line 212 to the servo DSP 120. The servo DSP 120 generates a "spindle control" signal on a signal line 213 in response to the motor speed signal. In accordance with one embodiment of the present invention, the spindle control signal is generated as a digital signal. In such an embodiment, a digital-to-analog (D/A) converter 214 is provided to convert the digital spindle control signal to an analog spindle control signal which is coupled to the PWM control circuit 216. Alternatively, the spindle control signal may be output by the servo DSP 120 and received by the PWM control circuit 216 as an analog signal, or converted to a digital signal prior to receipt by the PWM control circuit 216.

Figure 1:
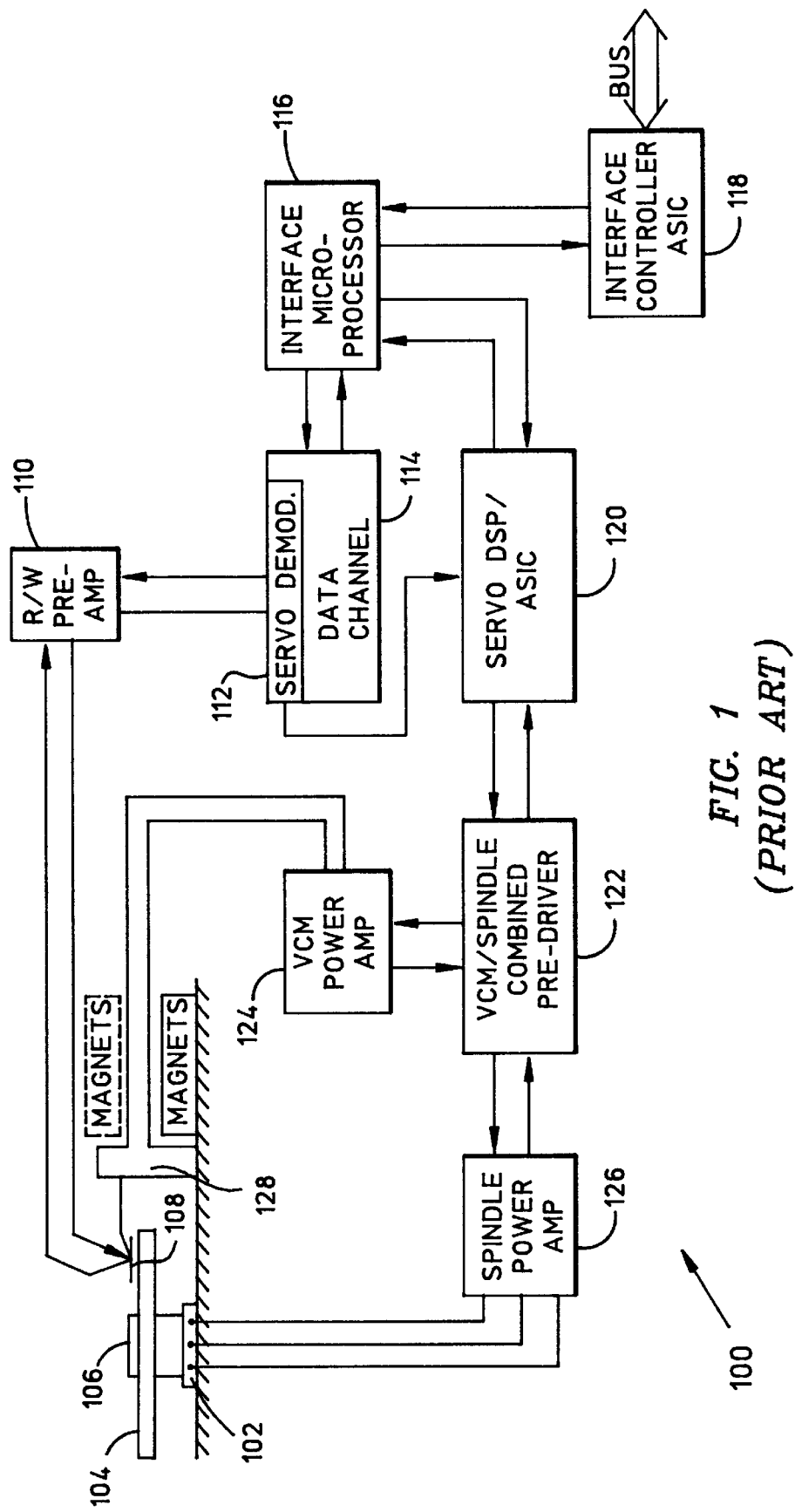
FIG. 1 is a schematic/block diagram of a direct access storage device.

In accordance with one embodiment of the present invention, the PWM control circuit 216 also receives a clock signal from the servo DSP 120, a drive sensor signal from a spindle power amplifier, such as the spindle power amplifier 126 shown in FIG. 1, and two control signals from the control register 218. The clock signal preferably has a frequency that is several times greater than the highest pulse rate anticipated to be applied to the spindle motor windings. The clock signal is used by the PWM control circuit 216 to generate the output signal that is coupled to the pre-amplifier 203. Details regarding the operation of the PWM control circuit 216 are provided below.

The first of the two control signals received from the control register 218 is a "PWM off-time" signal. The PWM control circuit 216 establishes the "off-time" (i.e., the amount of time during which no drive voltage is to be applied to the windings of the spindle motor) in response to the value represented by the PWM off-time signal. In accordance with one embodiment of the present invention, the off-time remains essentially constant at whatever duration is set by the off-time control signal. However, because the servo DSP 120 has the ability to control the values stored in the control register 218, the off-time control signal can be altered by the servo DSP 120 writing a new value to the control register through a serial port 220 when the tradeoff between current control precision, electrical noise reduction, or power efficiency changes due to a change in the operation of the DASD, such as when the DASD begins writing or reading from the disk.

The second of the two control signals received from the control register 218 is an "acoustic noise reduction control" signal. The acoustic noise reduction control signal indicates the amount of acoustic noise reduction to be provided in a manner that will be discussed in greater detail further below.

The output from the PWM control circuit is a pulse stream which is coupled to the pre-amplifier 203 to generate a spindle motor drive signal. In accordance with one embodiment of the present invention, the off-time is determined by the value stored in the control register 218. The off-time value is stored at the beginning of each mode of operation of the DASD, and is changed when the mode of the DASD changes, assuming that the new mode is associated with a different off-time value. The PWM control circuit controls the speed of the spindle motor by regulating the "on-time" (the amount of time during which drive voltage is to be applied to the windings of the spindle motor). In an alternative embodiment of the present invention, the on-time may be held determined as a function of the mode of operation and the off-time varied to control the rotational velocity of the spindle motor. In yet another alternative embodiment, both the on-time and the off-time may be varied in such a way as to change the duty cycle (i.e., the ratio of on-time with respect to offtime). In one particular implementation of this embodiment, the duration of each complete cycle is a function of the mode of operation of the DASD. Accordingly, the duration between two successive leading edges or two successive trailing edges remains constant throughout the mode of operation, regardless of the duration of the on and off-times. In an alternative embodiment, analog timers may be provided that charge and discharge capacitors at a predetermined rate to determine the timing.

The servo DSP 120 controls the contents of the control registers 218, and so the parameters of the signal output from the PWM control circuit 216, in order to optimize the output signal with regard to electrical noise and efficiency for each mode of operation. For example, when the servo DSP 120 determines from signals coupled to the servo DSP 120 that a read operation is to be performed, the servo DSP 120 updates the contents of the control register 218 to increase the off-time and to reduce the slew rate in order to reduce the amount of electrical noise that is generated by the spindle motor drive circuit. It should be understood that in the case in which the off-time is not held constant, the contents of the control register are updated in order to cause the output signal to have a generally lower fundamental frequency, such as by increasing the on-time or the cycle time. Additional details regarding the relationship between the modes of operation and the information to be loaded in the control register 218 by the servo DSP 120 will be discussed later.

In accordance with one embodiment of the present invention, the pre-amplifier 203 performs at least the following two functions. First, the pre-amplifier 203 controls the slew rate of the drive signals to be applied to the windings 204, 206, 208 of the spindle motor. In the preferred embodiment of the present invention, a "PWM slew rate control" signal is coupled from the control register 218 to the pre-amplifier 203. The pre-amplifier 203 establishes the slew rate of the drive signals output from the pre-amplifier 203 in response to the value of the PWM slew rate control signal received by the pre-amplifier 203. The servo DSP 120 is therefore capable of controlling the slew rate of the drive signals to be applied to the windings 204, 206, 208 of the spindle motor in response to particular modes of operation or other conditions that are relevant to the amount of noise generated by, and power efficiency of, the spindle motor drive circuit.

The second function of the pre-amplifier 203 is to receive the commutation signal from the commutation logic/control circuit 202 and establish the timing of the drive to each of the windings 204, 206, 208 of the spindle motor 102. It should be noted that in accordance with one embodiment of the present invention, the servo DSP 120 outputs an "internal/external commutation select" signal that allows an external source to provide the commutation scheme.

VCM Drive Circuit

Turning now to the operation of the VCM drive circuit, the control pre-amplifier 230 is coupled to the control register 232. The control register 232 stores parameters that: (1) determine whether the control pre-amplifier 230 is to operate in linear mode or PWM mode; (2) determine the PWM frequency (i.e., the cycle time) at which the control pre-amplifier 230 is to operate; and (3) adjusts the PWM slew rate baseline set by the resistor 238. The control register 232 is loaded by the servo DSP 120 with control data via the serial port 220. Control data can also be read from the control register 232 by the servo DSP 120 through the serial port 220. The servo DSP 120 sets the control data based upon the particular operations being performed by the DASD (i.e., the current mode of operation), similar to the way in which the servo DSP 120 sets the control data in the control register 218 of the spindle motor drive circuit.

The servo DSP 120 receives head position information from a servo demodulator, such as the servo demodulator 112 shown in FIG. 1, over a signal line 224. The servo DSP 120 generates a VCM control signal which is output over a signal line 226 to cause the VCM control circuit to properly position the read/write head 108. In accordance with one embodiment of the present invention, the VCM control signal is a digital signal that is coupled to a digital-to-analog D/A converter 228. The analog output from the D/A converter 228 is coupled to the pre-amplifier 230. Alternatively, the output from the servo DSP 120 is an analog signal, or a digital VCM control signal is coupled directly to the linear/PWM control preamplifier, which digitally amplifies the signal prior to conversion to an analog signal. The control pre-amplifier 230 is capable of outputting either a linear drive signal or a PWM drive signal. An electrically resistive element 238, such as a resistor, preferably provides a slew rate baseline value.

The output from the control pre-amplifier 230 is coupled to a power amplifier, such as the power amplifier 124a, 124b shown in FIG. 1. The current that flows through the VCM 128 causes a voltage potential to be generated across a resistor 234, or other such electrically resistive element. The voltage potential is then applied to a current sensor amplifier 236 which amplifies the voltage and couples the amplified voltage to the control pre-amplifier 230 as a feedback signal.

Slew Rate Control

The present invention provides a means by which the slew rate of either the VCM or spindle motor of a DASD can be controlled based upon particular conditions or the operational mode of the DASD. For example, when power is initially applied to a DASD, the disk must first achieve operational rotational velocity before any data transfer to, or from, the disk can occur. During this time, the amount of electrical noise (electromagnetic waves, conductive noise along circuit paths within the internal circuitry, etc.) is less critical. However, maximizing the efficiency of the spindle motor is important in order to decrease power consumption and achieve operational rotational velocity as rapidly as possible. Likewise, during idle periods when the disk must maintain the operational rotational velocity, but when no data is being transferred to, or from, the disk, the efficiency of the spindle motor may be more important than the amount of electrical noise that is being produced by the spindle motor drive circuit.

Figure 5B:
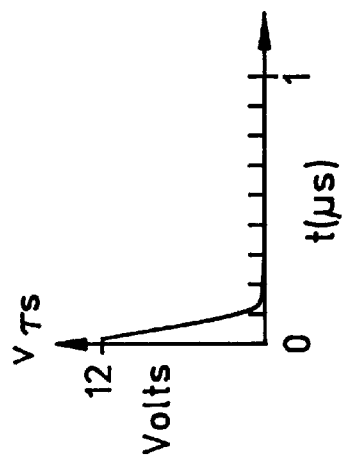
FIG. 5b is graph of the output voltage at the drain of the pre-amplifier output transistors of either the VCM or the spindle motor pre-amplifier verses time with no reduction in the slew rate.
Figure 5D:
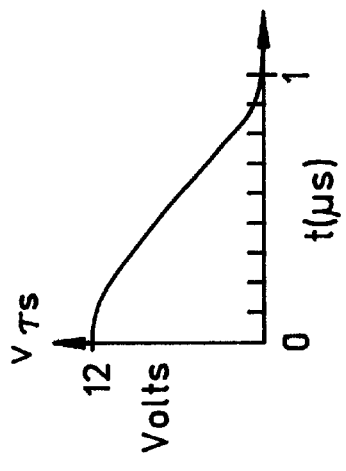
FIGS. 5c and 5d illustrate the gate voltage held at the threshold voltage for nearly 1 $\mu$s, resulting in a drain voltage which drops from a high to a low voltage level in approximately 1 $\mu$s.
Figure 5A:
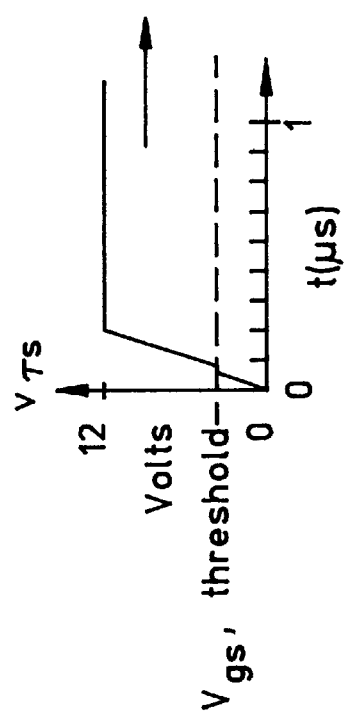
FIG. 5a is a graph of the gate voltage versus time at the gate of the pre-amplifier output transistors of either the VCM or the spindle motor pre-amplifier.
Figure 5C:
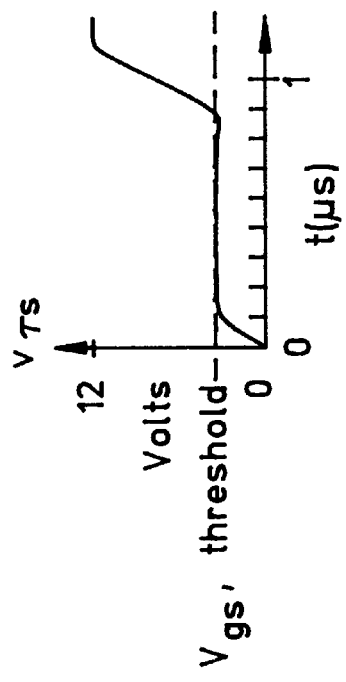

In accordance with one embodiment of the present invention, data stored within the control registers 232, 218 is coupled to the control pre-amplifiers 203, 230 to allow the servo DSP 120 to control the slew rate of the VCM and spindle motor PWM drive signals. FIG. 5a is a graph of the gate voltage ($V_{gs}$) verses time at the gate of the pre-amplifier output transistors of either the control or the spindle motor pre-amplifier 203, 230. FIG. 5b is graph of the output voltage ($V_{ds}$) at the drain of the pre-amplifier output transistors of either the control or the spindle motor pre-amplifier 203, 230 verses time with no reduction in the slew rate. In contrast, the present invention allows a desired reduction in the slew rate to be achieved by maintaining the gate voltage $V_{gs}$ at the threshold (i.e., the point at which the transistor transitions from a non-conductive state to a conductive state) for a predetermined amount of time. As shown in FIGS. 5c and 5d, the gate voltage $V_{gs}$ is held at the threshold voltage for nearly 1 $\mu$s, resulting in a drain voltage $V_{ds}$ which drops from a high to a low voltage level in approximately 1 $\mu$s. Thus, the slew rate can be controlled. It will be understood by those skilled in the art that the amount of slew rate limiting that occurs is a function of the characteristics and electrical parameters of the transistors within the pre-amplifiers. The greater the internal capacitance of the transistor, the slower the transistor will turn on.

In accordance with one embodiment of the present invention, the control registers may be capable of storing a slew rate control parameter that can be assigned one of a plurality of values, each value being used to instruct the associated pre-amplifier to apply a different amount of slew rate control. In such a case, the values that are written to the control registers 232, 218 are selected to provide the optimal slew rate for the current mode of operation, taking into account the noise tolerance and the desire for efficiency associated with the mode of operation. Alternatively, the control registers 232, 218 can have one of two values, the first instructing the associated pre-amplifier 230, 203 to operate without any slew rate reduction, and the second instructing the associated pre-amplifier to operate with a predetermined amount of slew rate reduction. Thus, switching noise can be reduced at the expense of increased switching losses, and visa verse. In addition, the control register 218 associated with the spindle motor drive circuit preferably stores two slew rate values. The first is associated with the upper transistors 240 of the power amplifier 126, and the second is associated with the lower transistors 242 of the power amplifier 126. Accordingly, the slew rate of the upper power amplifier transistors 240 and the lower power amplifier transistors 242 can be independently controlled.

Adaptive Pulse Width Modulation

In accordance with the preferred embodiment of the present invention, the transition rate (i.e., the number of transitions that occur within a predetermined amount of time) can be varied to optimize the tradeoff between power efficiency and noise generation. As noted above, the servo DSP 120 has the ability to control the transition rate by writing control data to the control register 218.

Figure 6:
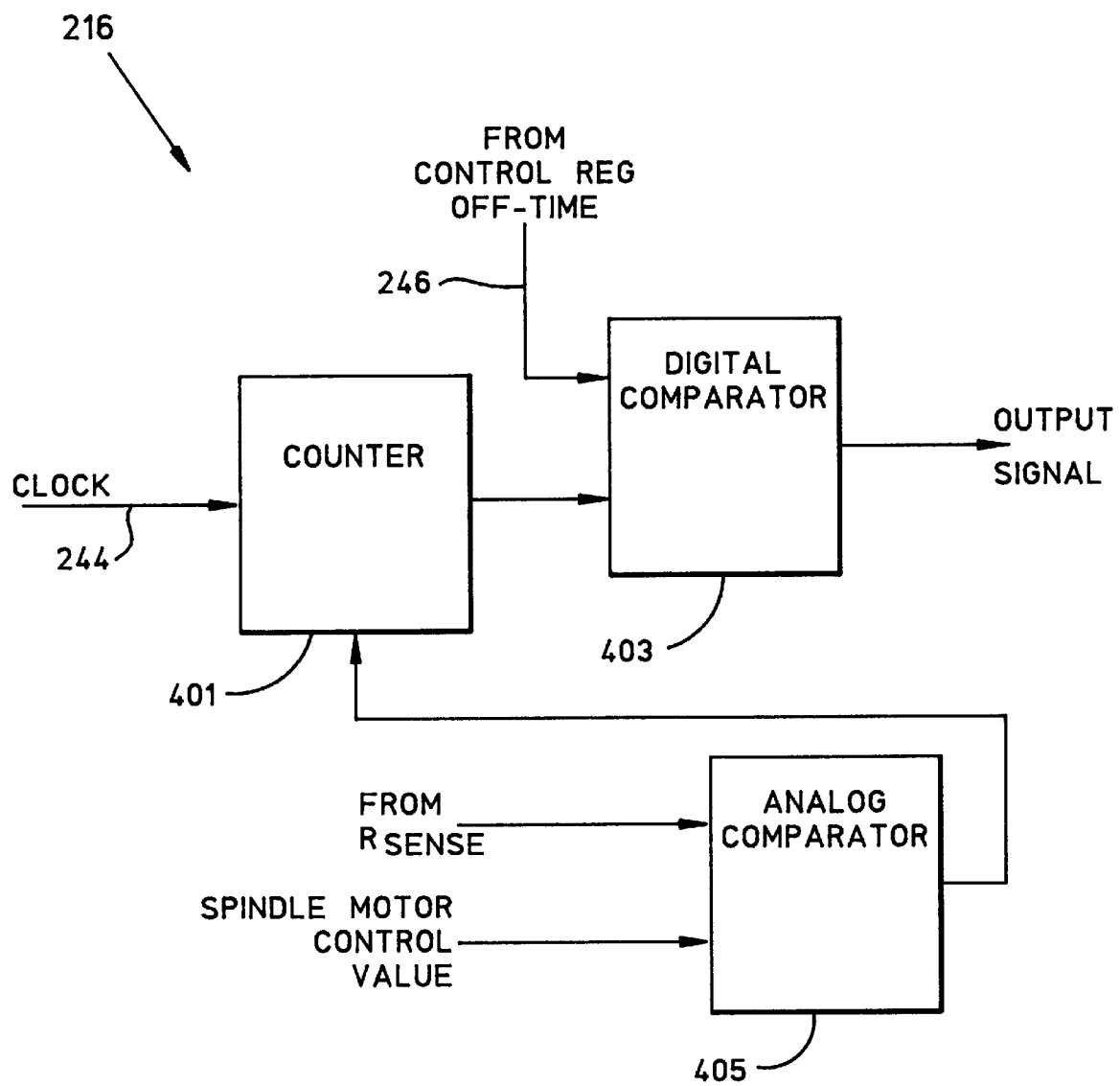
FIG. 6 is a block diagram of the PWM control circuit.

FIG. 6 is a block diagram of the PWM control circuit 216. In accordance with one embodiment of the present invention, the PWM control circuit 216 receives a clock signal from the servo DSP 120 over signal line 244. The clock signal has a cycle time that is several times shorter than the cycle time of the signal output from the PWM control circuit 216. The PWM control circuit 216 includes a counter 401 that receives the clock signal and outputs a count value. The counter 401 is reset at the end of each cycle.

The output from the counter 401 is coupled to a digital comparator 403 that compares the count value output from the counter 401 to the off-time value that is coupled to the PWM control circuit 216. The PWM control circuit 216 receives the off-time signal on signal line 246. When the count value output from the counter 401 is less than the off-time value, the output from the PWM control circuit is low, when the output from the counter 401 is greater than the off-time value, then the output from the PWM control circuit 216 is high. The output from the counter 401 is also coupled to an analog comparator 405 which compares a voltage level taken across a resistor $R_{sense}$ 248 (shown in FIG. 4) to the spindle motor control voltage. The difference between these voltages is an "error" voltage. Since all the current that flows through the motor windings 204, 206, 208 during the "ON TIME" must flow through the resistor 248 the voltage that is developed across the resistor 248 is representative of the total current flowing through the windings of the motor 102 during the ON TIME. When the total current flowing through the windings of the motor reaches the threshold set by the spindle motor drive signal which is coupled to the analog comparator 405, the output from the comparator 405 resets the counter 401, thus determining the end of each cycle of the PWM control circuit output, and thus in turn, the duty cycle of the PWM pulses and the amount of drive to be applied to the spindle motor windings 204, 206, 208. Accordingly, the drive to the spindle motor windings 204, 206, 208 is proportional to the error voltage.

In accordance with the present invention, the value stored in the control register and coupled to the digital comparator in order to alter the off-time of each pulse allows the servo DSP 120 to control the transition rate. That is, the greater the off-time between pulses, the longer the pulses will be in order for the total current through the windings of the motor 102 to return to a value that results in a voltage across the resistor 248 that is greater than the spindle motor control value. This, in turn, means that the amount of time between transitions of the output transistors will increase, the harmonic content of the PWM waveforms will decrease, the ripple in the current through the windings of the motor will increase, and the transistor switching losses will decrease.

In accordance with one embodiment of the present invention, the servo DSP 120 writes values to the control register 218 which reduce the amount of electrical noise during noise sensitive operations, such as read and write operations. Likewise, the servo DSP 120 writes values to the control register 218 which increase the power efficiency of the drive circuit when the operation of the DASD is not noise sensitive, such as during start-up, idle, and seek operations. In addition, in alternative embodiments of the present invention, the adjustments to the PWM parameters can be accomplished by self-calibration, or by fixing the parameters as a part of the manufacturing process on a population or file level basis. In addition, in an alternative embodiment of the present invention, the parameters may be set by a state machine, programmable device within the PWM control circuit or elsewhere in the system, hardwired, or embedded in microcode. Accordingly, it should be clear that there are a number of different ways in which to determine the tradeoff between electrical noise and power efficiency and the conditions under which such tradeoffs should be made. For example, an increase in the PWM frequency results in less current ripple, and thus less power supply filtering or decoupling is required, resulting in marginal cost savings. The present invention provides a means by which these tradeoffs can be made dynamically in order to optimize the operation of the drive circuit for particular circumstances "on the fly" as those circumstances change.

Figure 3:
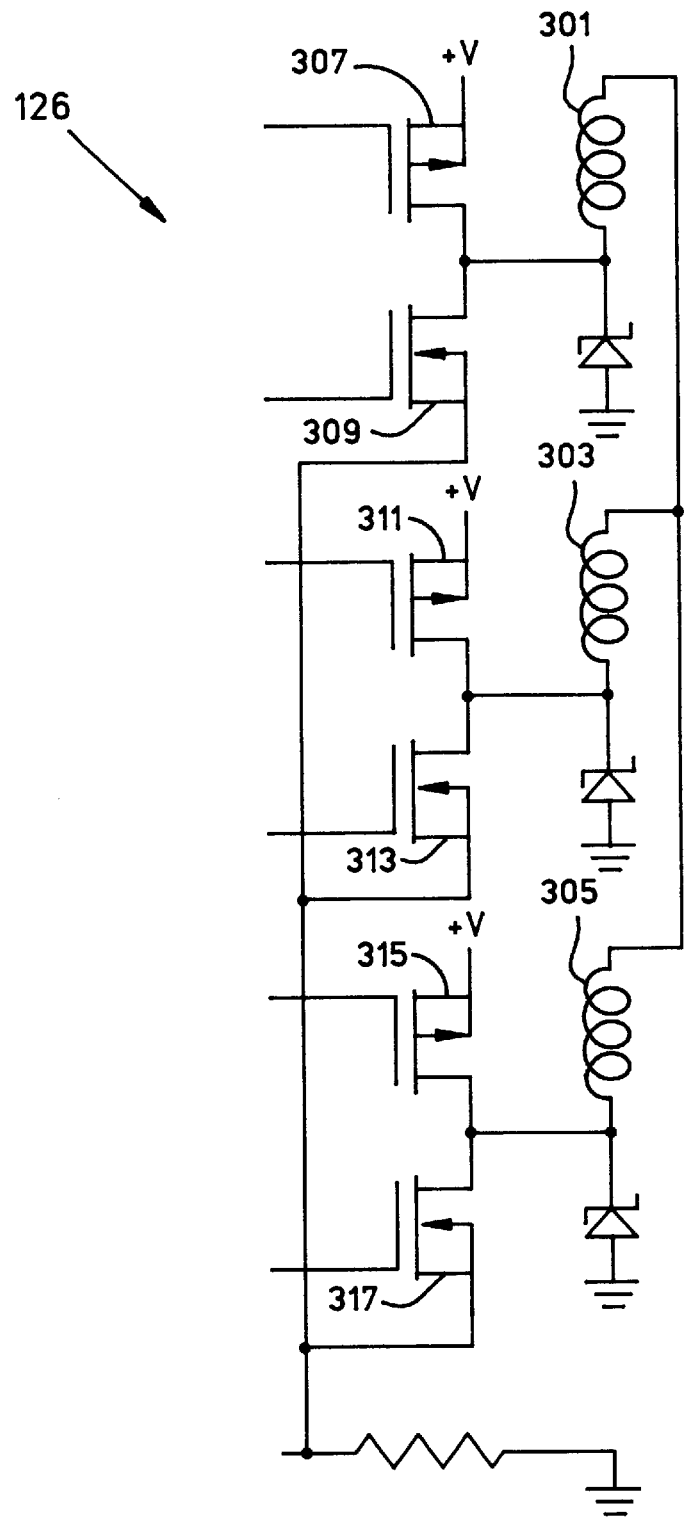
FIG. 3 is a schematic of the output stages of a power amplifier which drives the windings of a three phase motor.

It should be noted that significant improvements can be achieved by combining adaptive pulse width modulation with synchronous rectification. Synchronous rectification involves turning on the non-switching transistor when the associated switching transistor is turned off. That is, when the current is being pulsed, either the upper or the lower conducting transistor acts as a switching transistor by turning on and off at the PWM rate. If the lower transistor 309, 313, 317 (see FIG. 3) is being pulsed, then when the lower transistor 309, 313, 317 is turned off, a "fly-back" voltage is generated by the reduction of current in the two conducting windings. By turning on the upper transistor 307, 311, 315 in the output amplifier leg in which the lower transistor 309, 313, 317 was turned off, the voltage across the two formerly conducting windings is clamped to the power supply voltage at both ends. Likewise, if the upper transistor pulsed, then the lower transistor would be turned on when the associated upper transistor is turned off. It should be understood that without current limiting, damage will occur to the output transistors 307, 309, 311, 313, 315, 317 if both the upper transistor and the lower transistor to which the upper transistor is coupled are on at the same time.

With regard to the use of adaptive PWM with a VCM, in accordance with one embodiment of the present invention, the servo DSP 120 detects the head position and updates the values stored in the control register 232 to alter the transition rate and thus cause the frequency of the pulses to increase as the head approaches the target. The parameter used to determine the frequency of the PWM mode is preferably the amount of current that flows through the VCM, as detected by the current sensor amplifier 236. That is, the more current flows through the VCM, the further the read/write head is from the ultimate destination and the more slowly the drive circuit will be pulsed. As the read/write head approaches the destination, the current through the VCM will decrease, and the drive circuit will preferably begin to pulse more rapidly in order to increase the resolution with which the VCM can be driven. As the read/write head reaches the destination, the VCM drive will enter linear mode in order to provide maximum resolution for tracking the desired cylinder and in order to reduce the amount of electrical noise that is generated. When the head is to be moved to another cylinder, the VCM drive circuit switches back to PWM mode. Alternatively, the distance between the current head position and the desired position, as determined by the servo DSP 120 may be used to determine the frequency of the PWM mode.

Acoustic Noise Reduction

Figure 2:
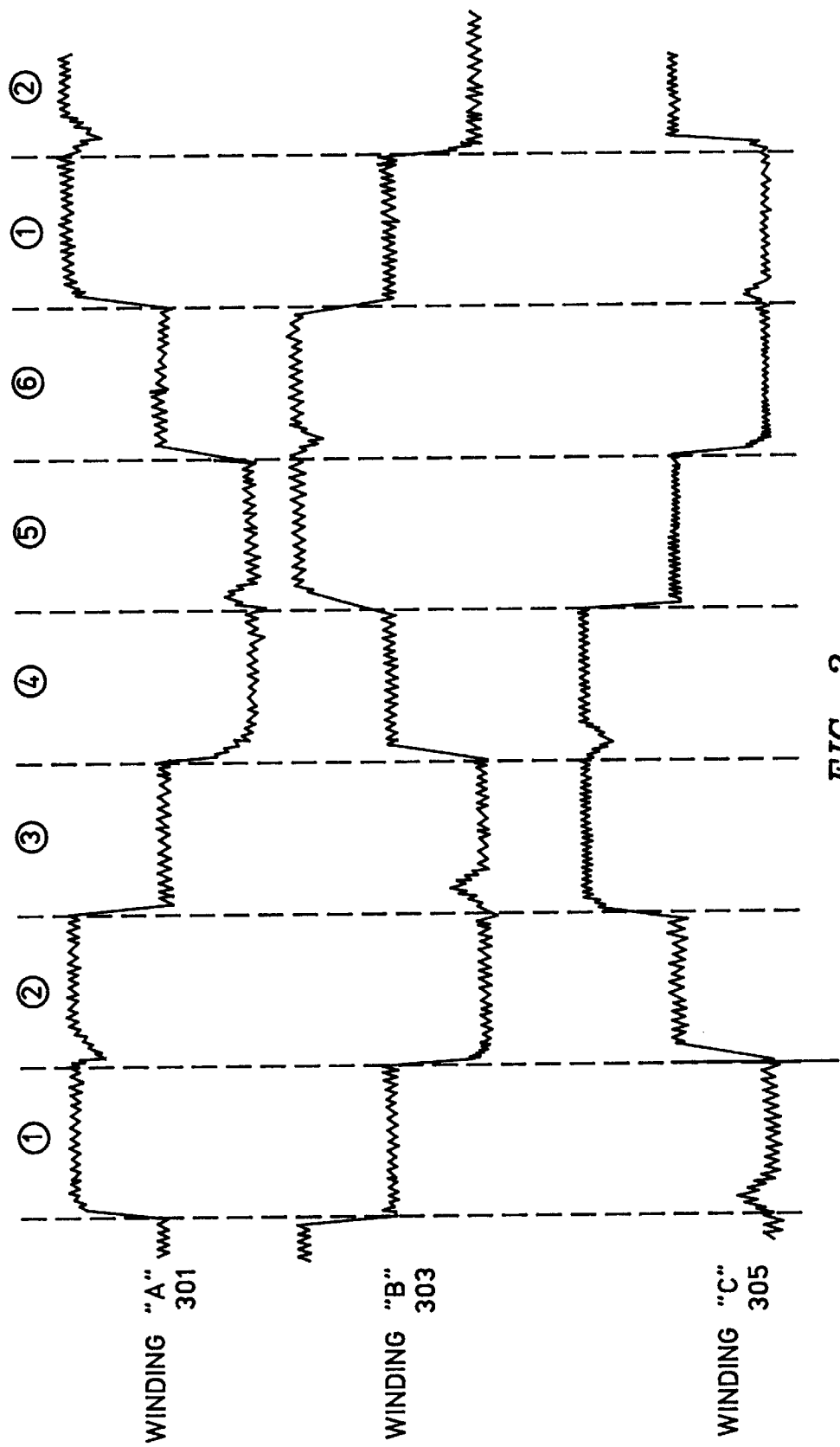
FIG. 2 is a plot of the current that flows through the three windings of a three phase motor in accordance with one commutation scheme.

Referring to FIG. 2, it can be seen that current flows in the same direction through each of the windings for two consecutive phases of the commutation scheme. For example, current flows through winding A in the positive direction during phase 1 and 2. No current flows in winding A during phase 3. Current then flows through winding A in the negative direction during phase 4 and 5. In addition, it can be seen that a dip occurs in the current that flows through the windings of the motor at each commutation time because the current that flows through the winding that ceases conducting decreases faster than the current increases in the winding that begins conducting. That is, the transistors 307, 309, 311, 313, 315, 317 are capable of turning off more rapidly than they can turn on. This periodic dip in the total winding current introduces acoustic noise which can be disturbing to the user.

Figure 7:
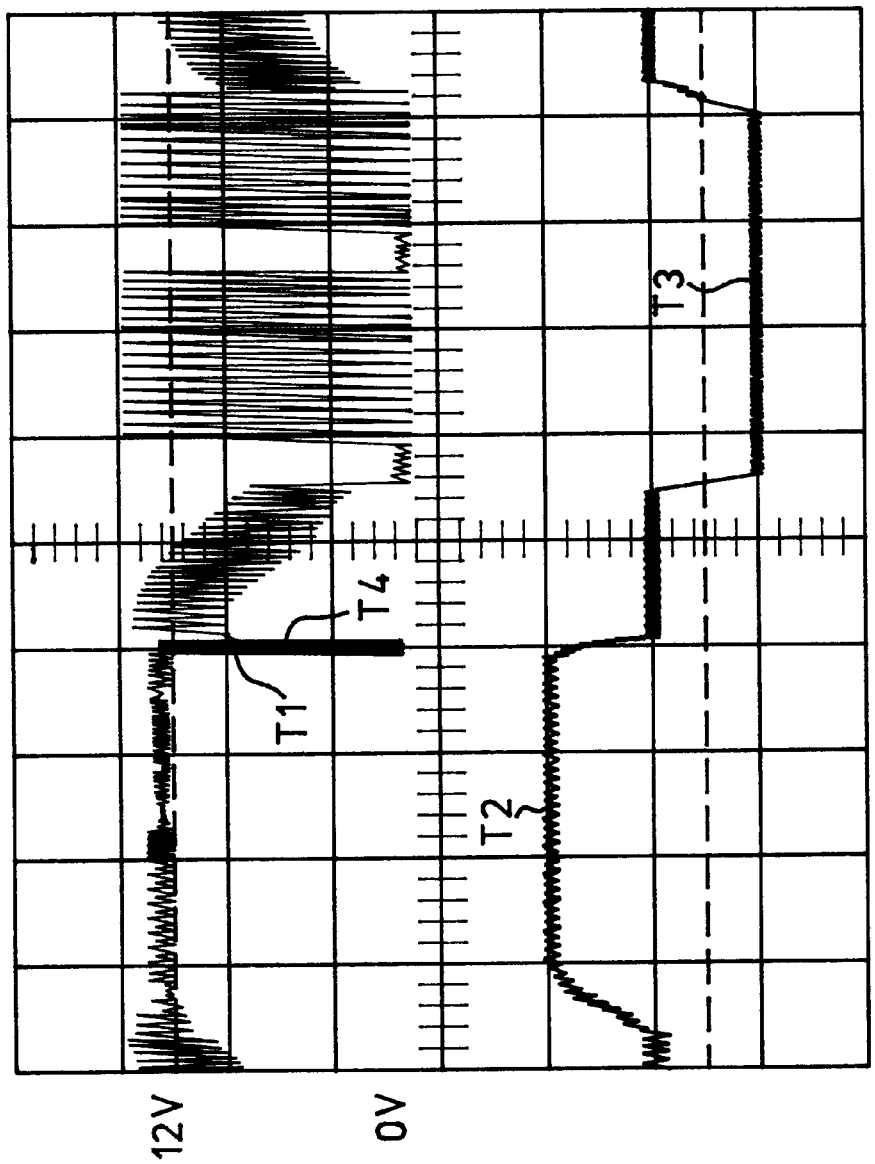
FIG. 7 is essentially the same as FIG. 2, except for the following: only one winding current is shown; the winding voltage associated with winding for which the current is plotted is shown; and acoustic noise reduction pulses have been used to reduce the acoustic noise generated by the motor.

In accordance with the present invention, acoustic noise reduction is accomplished by pulsing at least one of the transistors that are changing state. FIG. 7 is essentially the same as FIG. 2, except for the following: only one winding current is shown; the winding voltage is also shown; and acoustic noise reduction pulses are present between times T1 and T4.

In accordance with the present invention, the control register 218 stores a value that determines the frequency of the acoustic noise reduction pulses. Alternatively, a value stored within the control register 218 merely indicates whether acoustic noise reduction is to be provided.

Acoustic noise reduction is provided by the PWM control circuit 216 as follows. At the time T1 at which a commutation occurs, rather than simply turning off the upper transistor 307, 311, 315, the upper transistor is pulsed at a rate that is determined by the value stored in the control register 218 for a period of time which is also determined by a value stored in the control register 218. It should be understood that these values may be coupled to the PWM control circuit 216 from any source, such as directly from the servo DSP 120, from an external processor, from an analog circuit comprising capacitors and a charging current source, or these values may be fixed in firmware, hardwired into the circuitry of the control circuit 216, or programmed into a software routine that is executed by a programmable device within the control circuit 216. FIG. 7 reveals that the dip in total current that occurs at each commutation is not present in the current plot at commutation times T2 and T3. This is due to the fact that the total amount of current that flows through the motor is more precisely controlled during commutations by the introduction of the acoustic noise reduction pulses that occur from the time T1 to the time T4 during the time that each upper transistor 307, 311, 315 would otherwise be turning off. Accordingly, additional current is made available to the motor to prevent the total current from dipping during each commutation. Elimination of the current dips at times T2 and T3 reduces significantly the acoustic noise that is generated by the motor.

Figure 8:
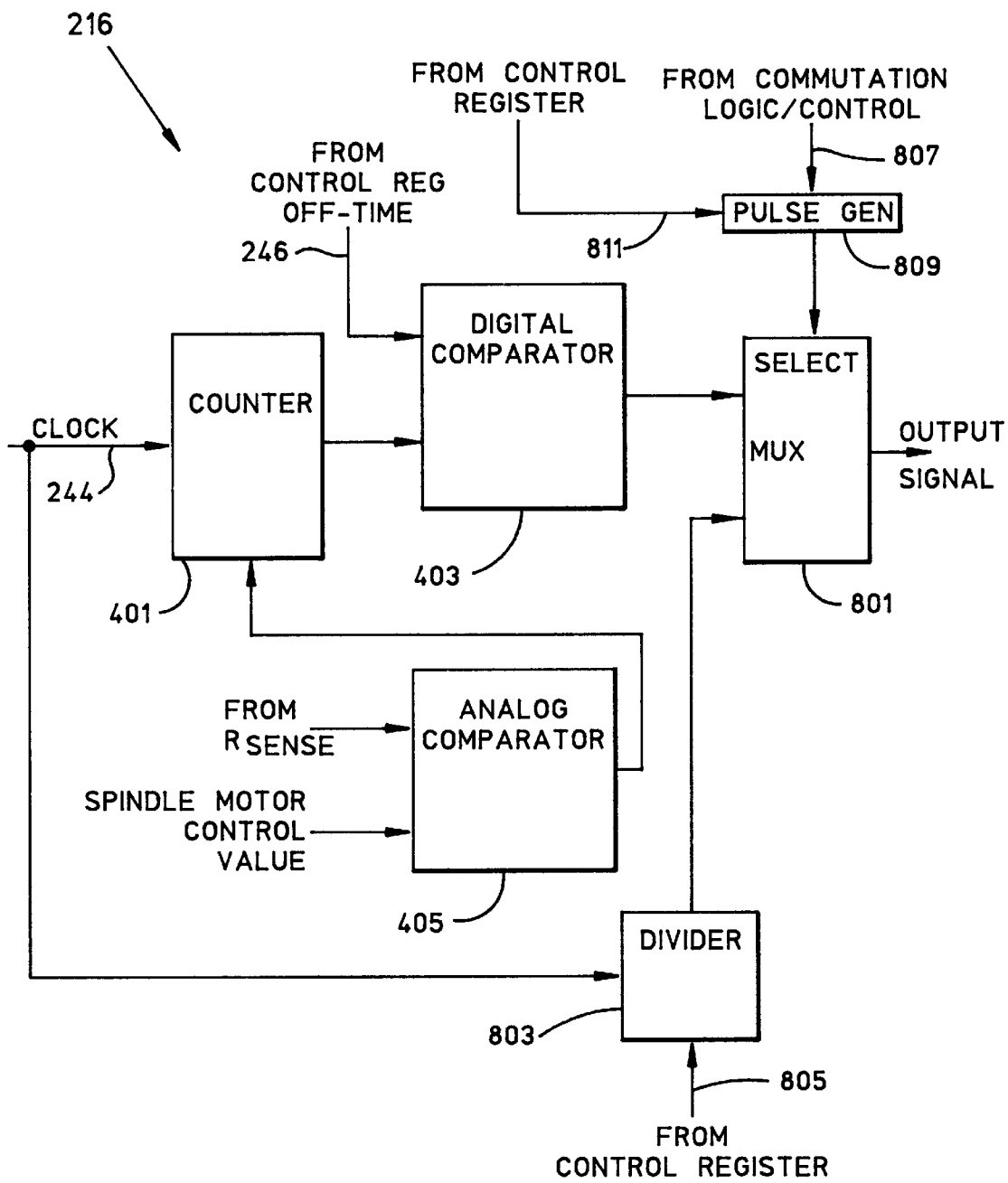
FIG. 8 is a simplified block diagram of the PWM control circuit with acoustic noise reduction capability.

FIG. 8 is a simplified block diagram of the PWM control circuit 216 with acoustic noise reduction capability. The output from the digital comparitor 403 is coupled to a first input to a multiplexer 801. A second input to the multiplexer 801 is coupled to the output of a divider 803 that divides the clock signal to the desired acoustic noise reduction pulse rate which is indicated by the value stored in the control register 218 and which is coupled to the divider over signal line 805. A select signal line 807 is coupled from the control register 218 to a pulse generator circuit 809. The select signal line provides a signal from the commutation logic/control circuit 202 to the PWM control circuit 216 to indicate when each commutation time T1 begins. The pulse generator 809 outputs a pulse having a duration that is determined by a value stored within the control register 218 and coupled to the pulse generator on a signal line 811. The pulse which is output from the pulse generator 809 is coupled to the select input of the multiplexer 801 to cause the multiplexer 801 to output either the PWM pulses generated by the digital comparitor 403, as described above, or the preferably higher frequency acoustic noise reduction pulses generated by the divider 803.

While there have been shown what are presently considered to be preferred embodiments of the invention, it will be apparent to those skilled in the art that various changes and modifications can be made herein without departing from the scope of the invention as defined by the appended claims. Accordingly, other embodiments and modifications of this invention may occur to those of ordinary skill in the art in view of these teachings. Therefore, this invention is to be limited only by the following claims viewed in conjunction with the above specification and accompanying drawings.

I claim:

1. An adaptive pulse width modulated motor controller for driving a motor within a noise sensitive device, including:
   (a) a pulse width modulation control circuit which generates motor drive pulses having a duty cycle proportional to an error signal and having a controllable motor drive pulse transition rate; and
   (b) a control circuit, coupled to the pulse width modulation control circuit, which changes the motor drive pulse transition rate in response to changes in conditions within the noise sensitive device.

2. The adaptive pulse width modulated motor controller of claim 1, wherein the control circuit includes a control register in which is stored a value, the value being coupled to the pulse width modulation control circuit to control the motor drive pulse transition rate.

3. The adaptive pulse width modulated motor controller of claim 1, wherein the noise sensitive device is a direct access data storage device having a disk.

4. The adaptive pulse width modulated motor controller of claim 3, wherein:
   (a) the conditions in the direct access data storage device include reading from the disk, writing to the disk, starting the disk rotating, maintaining the disk in an idle condition, seeking a particular location on the disk, performing a soft error recovery procedure during a read or write operation; and
   (b) the control circuit increases the transition rate of the motor drive pulses for reading and writing to the disk, and decreases the transition rate of the motor drive pulses for starting the disk rotating, maintaining the disk in an idle condition, and seeking a particular location on the disk; and decreases transition rate as part of soft error recovery procedure.

5. The adaptive pulse width modulated motor controller of claim 1, wherein the motor drive pulses have an off-time, and the control circuit sets the off-time of the motor drive pulses as a function of the conditions of the noise sensitive device.

6. The adaptive pulse width modulated motor controller of claim 1, wherein the motor drive pulses have an on-time, and the control circuit sets the on-time of the motor drive pulses as a function of the conditions of the noise sensitive device.

7. The adaptive pulse width modulated motor controller of claim 1, wherein the motor drive pulses have a cycle time, and the control circuit sets the cycle time of the motor drive pulses as a function of the conditions of the noise sensitive device.

8. An adaptive pulse width modulated motor controller for controlling the speed of a motor coupled to a noise sensitive device, including:
   (a) a pulse width modulation control circuit which generates motor drive pulses having a duty cycle proportional to an error signal and having a controllable slew rate; and
   (b) a control circuit, coupled to the pulse width modulation control circuit, which changes the motor drive pulse slew rate in response to changes in conditions within the noise sensitive device.

9. The adaptive pulse width modulated motor controller of claim 8, wherein the control circuit includes a control register in which is stored a value, the value being coupled to the pulse width modulation control circuit to control the motor drive slew rate.

10. The adaptive pulse width modulated motor controller of claim 8, wherein the noise sensitive device is a direct access data storage device.

11. The adaptive pulse width modulated motor controller of claim 10, wherein:
   (a) the conditions within the direct access data storage device include reading from a disk, writing to the disk, starting the disk rotating, maintaining the disk in an idle condition, seeking a particular data location on the disk, performing a soft error recovery procedure during a read or write operation; and
   (b) the control circuit causes the slew rate to decrease for reading and writing to the disk, or nor soft error recovery and increase when starting the disk rotating and during an idle condition.

12. An adaptive pulse width modulated motor controller for controlling the speed of a motor within a direct access storage device, the motor having windings, including:
   (a) a motor drive circuit having an output which provides drive to the windings of the motor within the direct access storage device; and
   (b) an acoustic noise reduction circuit, coupled to the motor drive circuit, that modulates the output of the motor drive circuit in order to maintain a constant total current level through the windings of the motor.

13. The adaptive pulse width modulated motor controller of claim 12, wherein the acoustic noise reduction circuit modulates the output of the motor drive circuit by increasing the transition rate during commutations.

14. The adaptive pulse width modulated motor controller of claim 13, wherein the output of the motor drive circuit is applied to less than all of the windings at any one time and the particular windings to which the output of the motor drive circuit is applied changes during commutations, and further wherein the motor drive circuit causes the drive applied to each winding to be pulsed at a relatively higher rate for a predetermined amount of time before drive is removed from each winding.

15. A method for driving a motor within a noise sensitive device, including the steps of:
   (a) generating motor drive pulses having a duty cycle proportional to an error signal and having a transition rate; and
   (b) changing the motor drive pulse transition rate in response to changes in conditions within the noise sensitive device.

16. The method of claim 15, further wherein the step of changing the motor drive pulse transition rate includes the steps of:
   (a) storing a value in a control register; and
   (b) coupling the stored value to a pulse width modulation control circuit to control the motor drive pulse transition rate.

17. The method of claim 15, wherein the noise sensitive device is a direct access data storage device having a disk.

18. The method of claim 15, wherein the conditions in the direct access data storage device include reading from the disk, writing to the disk, starting the disk rotating, maintaining the disk in an idle condition, seeking a particular location on the disk, performing a soft error recovery procedure during a read or write operation and wherein the step of changing the motor drive pulse transition rate includes the steps of:
   (a) increasing the transition rate of the motor drive pulses for reading and writing to the disk; and
   (b) decreasing the transition rate of the motor drive pulses for starting the disk rotating, maintaining the disk in an idle condition, and seeking a particular location on the disk or soft error recovery.

19. The method of claim 15, wherein the motor drive pulses have an off-time, and the step of changing the motor drive pulse transition rate includes setting the off-time of the motor drive pulses as a function of the conditions of the noise sensitive device.

20. The method of claim 15, wherein the motor drive pulses have an on-time, and the step of changing the motor drive pulse transition rate includes setting the on-time of the motor drive pulses as a function of the conditions of the noise sensitive device.

21. The method of claim 15, wherein the motor drive pulses have a cycle time, the step of changing the motor drive pulse transition rate includes setting the cycle time of the motor drive pulses as a function of the conditions of the noise sensitive device.

22. A method for controlling the speed of a motor coupled to a noise sensitive device, including:
   (a) generating motor drive pulses having a duty cycle proportional to an error signal and a having a controllable slew rate; and
   (b) changing the motor drive pulse slew rate in response to changes in conditions within the noise sensitive device.

23. The method of claim 22, wherein the step of changing the motor drive pulse slew rate includes the steps of storing a value in a control register and coupling the stored value to a pulse width modulation control circuit to control the motor drive slew rate.

24. The method of claim 22, wherein the noise sensitive device is a direct access data storage device.

25. The method of claim 24, wherein the conditions within the direct access data storage device include reading from a disk, writing to the disk, starting the disk rotating, maintaining the disk in an idle condition, seeking a particular data location on the disk, performing a soft error recovery procedure during a read or write operation and the step of changing the motor drive pulse slew rate includes the step of:

(a) decreasing the slew rate for reading and writing to the disk; and (b) increasing the slew rate when starting the disk rotating and during an idle condition.

26. A method for controlling the speed of a motor within a direct access storage device, the motor having windings, including the steps of:

(a) driving the windings of the motor within the direct access storage device; and (b) modulating the output of the motor drive circuit in order to maintain a constant total current level through the windings of the motor.

* * * * *